US008272448B2

(12) United States Patent
Mack

(10) Patent No.: US 8,272,448 B2
(45) Date of Patent: Sep. 25, 2012

(54) SPRING LOADED ANCHOR SYSTEM FOR ELECTRO-COIL TUBING DEPLOYED ESP'S

(75) Inventor: John J. Mack, Catoosa, OK (US)

(73) Assignee: Baker Hughes Incorporated, Houston, TX (US)

( * ) Notice: Subject to any disclaimer, the term of this patent is extended or adjusted under 35 U.S.C. 154(b) by 421 days.

(21) Appl. No.: 12/580,125

(22) Filed: Oct. 15, 2009

(65) Prior Publication Data

US 2010/0096144 A1 Apr. 22, 2010

Related U.S. Application Data

(60) Provisional application No. 61/106,569, filed on Oct. 18, 2008.

(51) Int. Cl.
*E21B 23/01* (2006.01)
*E21B 19/02* (2006.01)
*F16L 3/14* (2006.01)
*F16L 3/18* (2006.01)

(52) U.S. Cl. ..................... 166/385; 166/214; 166/242.2; 138/112; 138/113

(58) Field of Classification Search .................. 166/385, 166/214, 242.2; 138/112, 113
See application file for complete search history.

(56) References Cited

U.S. PATENT DOCUMENTS

| | | | | |
|---|---|---|---|---|
| 3,762,473 | A * | 10/1973 | Wolk | 166/241.5 |
| 4,523,640 | A * | 6/1985 | Wilson et al. | 166/64 |
| 5,269,377 | A | 12/1993 | Martin | |
| 5,435,351 | A * | 7/1995 | Head | 138/111 |
| 5,821,452 | A | 10/1998 | Neuroth et al. | |
| 5,988,286 | A * | 11/1999 | Dwiggins | 166/382 |
| 6,143,988 | A | 11/2000 | Neuroth et al. | |
| 6,167,915 | B1 | 1/2001 | Collie et al. | |
| 6,479,752 | B1 | 11/2002 | Neuroth et al. | |
| 6,557,630 | B2 * | 5/2003 | Harkins et al. | 166/250.01 |
| 7,000,696 | B2 * | 2/2006 | Harkins | 166/250.01 |

* cited by examiner

*Primary Examiner* — Giovanna Wright
(74) *Attorney, Agent, or Firm* — Bracewell & Giuliani LLP

(57) ABSTRACT

An electrical line for installation in a well for transmitting power to a well pump includes a string of coiled tubing. An electrical cable having insulated electrical conductors embedded within an elastomeric jacket extends longitudinally through the interior passage of the tubing. Body members are placed around the outer periphery of the electrical cable, and the body members are compressed onto the electrical cable through the use of an anchor assembly. The anchor assembly is held in a compressed state through the use of frangible support elements. Once the electrical cable is in place within the coiled tubing, the user applies an external force to cause the support elements to fail, thereby releasing the anchor assembly from its compressed state. The anchor assembly contacts the inner wall of the coiled tubing, such that the weight of the electrical cable is transferred to coiled tubing.

21 Claims, 3 Drawing Sheets

SPRING LOADED ANCHOR SYSTEM FOR ELECTRO-COIL TUBING DEPLOYED ESP'S

RELATED APPLICATIONS

This patent application claims priority to U.S. Provisional Patent Application Ser. No. 61/106,569 filed on Oct. 18, 2008, which is incorporated by reference in its entirety.

FIELD OF THE INVENTION

This invention relates in general to a method and apparatus for installing and supporting an electrical submersible pump cable, and in particular to an electrical submersible pump cable having spring loaded anchors for engaging an inside wall of coiled tubing after application of heat.

BACKGROUND OF THE INVENTION

Electrical submersible pumps (ESP) are normally installed on jointed production tubing and powered by an ESP cable attached to the outside of production tubing. All produced fluids are pumped up the production tubing to the surface.

Oil well completions are being developed to deploy ESPs on the bottom of continuous coiled tubing where the power cable is placed inside the coiled tubing. In these installations, produced fluids are pumped up the annulus between the coiled tubing and the production tubing, or well casing or liner. Many advantages are gained through the use of coiled tubing such as faster deployment, the elimination of a need for large workover rigs, and less frictional pumping losses.

Because an ESP cable cannot support its total vertical weight, cable support must be provided by the coiled tubing at regular intervals. Various proposals have been made to provide support, such as the use of dimpling and welding of the coil tubing after pulling the ESP cable through the tubing; however, improvements would be desirable.

SUMMARY OF THE INVENTION

Disclosed herein is an apparatus that allows for the transfer of the weight of a power cable to borehole tubing, such as coiled tubing, using compressible anchor assemblies and support pins. In one embodiment, the apparatus for supporting the weight of the power cable within the tubing in a borehole has a length of tubing, a length of power cable, a body member, a frangible support element and an anchor assembly. The body member is coupled to a portion of the outer periphery of the cable, with the body member having a first outer diameter and a second outer diameter, wherein the second outer diameter creates a flange for the anchor assembly. In one embodiment, the body member has an inner radius, the inner radius having helical grooves that match the power cable's pitch. When the body member is coupled to the power cable, a threaded connection is formed. Once the body member is coupled to the power cable, the anchor assembly is compressed to fit around the outer periphery of the body member. In an embodiment in which the frangible support element is a support pin, the support pin can be inserted through the anchor assembly's leaf springs such that the anchor assembly is fixed in a compressed state and coupled to the body member. In one embodiment of the present invention, there is a plurality of body members located along the length of the power cable, as well as a plurality of anchor assemblies located on each of the respective body members.

Once all of the anchor assemblies are in place and compressed, the cable may be transferred into the borehole tubing. The frangible support elements are subjected to a treatment method such that the support elements fail, causing the anchor assemblies to decompress and contact the inner wall of the borehole tubing. This contact point between the anchor assemblies and the inner wall of the borehole tubing acts to transfer the weight of the power cable to the borehole tubing.

In one embodiment of the present invention, the frangible support element is designed to fail at a predetermined temperature, such that support element can be heated to induce failure. In other embodiments of the present invention, the support element can be designed to fail at increased pressures, electrical charges, resonate frequency, or upon exposure to a solvent.

DETAILED DESCRIPTION OF THE INVENTION

Figure 1:
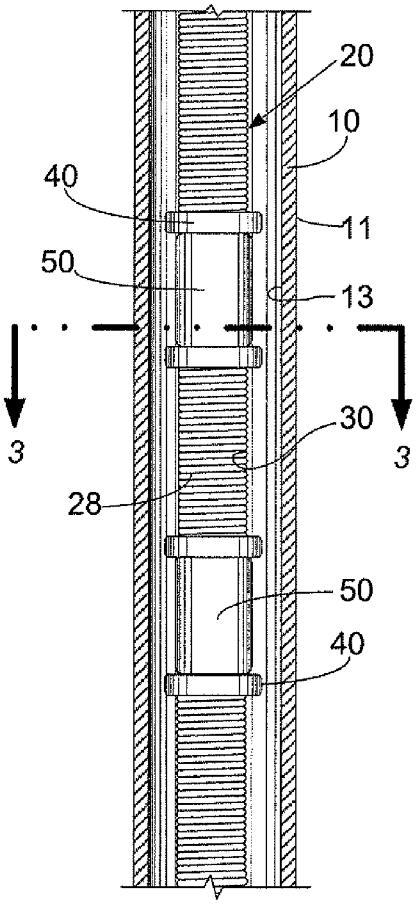
FIG. 1 is a partial longitudinal cross sectional view illustrating an electrical cable and coiled tubing assembly constructed in accordance with an embodiment of the present invention.

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout. For the convenience in referring to the accompanying figures, directional terms are used for reference and illustration only. For example, the directional terms such as "upper", "lower", "above", "below", and the like are being used to illustrate a relational location.

It is to be understood that the invention is not limited to the exact details of construction, operation, exact materials, or embodiments shown and described, as modifications and equivalents will be apparent to one skilled in the art. In the drawings and specification, there have been disclosed illustrative embodiments of the invention and, although specific terms are employed, they are used in a generic and descriptive sense only and not for the purpose of limitation. Accordingly, the invention is therefore to be limited only by the scope of the appended claims.

With reference now to FIG. 1, the electrical power line for a submersible pump includes a string of continuous coiled tubing [10]. Coiled tubing [10] is steel, has an outer diameter [11] and an inner wall [13] and is of conventional materials and dimensions. Coiled tubing [10] is capable of being wound on a large reel for transport to a well site, and then forced into a well. Power cable [20] is shown inserted through the length of coiled tubing [10]. Power cable [20] is a type particularly for supplying AC power from the surface to a downhole motor for driving a centrifugal pump (not shown), which is located at the lower end of coiled tubing [10].

Figure 3:
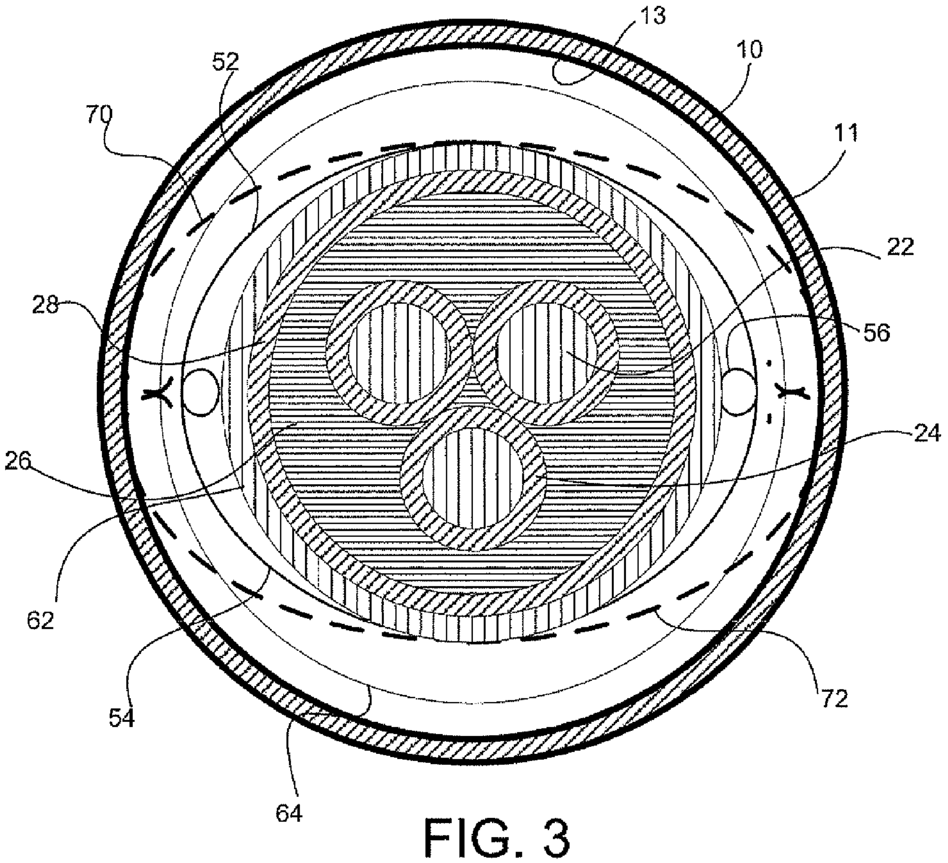
FIG. 3 is a cross sectional view along line 3-3 of FIG. 1.

As shown in FIG. 3, power cable [20] has three insulated conductors [22], each surrounded by an insulation layer [24]. An elastomeric jacket [26] is extruded over the three insulated conductors [22]. Elastomeric jacket [26] has a cylindrical outer diameter which is helically wrapped with a metal strip of armor [28], which forms helically spaced grooves [30] (FIG. 1). In one embodiment, elastomeric jacket [26] is of a material, such as Nitrile rubber, which resists swelling when exposed to hydrocarbon liquid. In this embodiment, tightly wrapped armor [28] deforms elastomeric jacket [26] and provides adequate frictional engagement between elastomeric jacket [26] and minor [28], preventing slippage due to the weight of power cable [20].

Referring back to FIG. 1, a plurality of body members [40] are mounted to power cable [20] at selected intervals. Each body member [40] has an anchor assembly [50] coupled on the body member's outer periphery.

Figure 2:
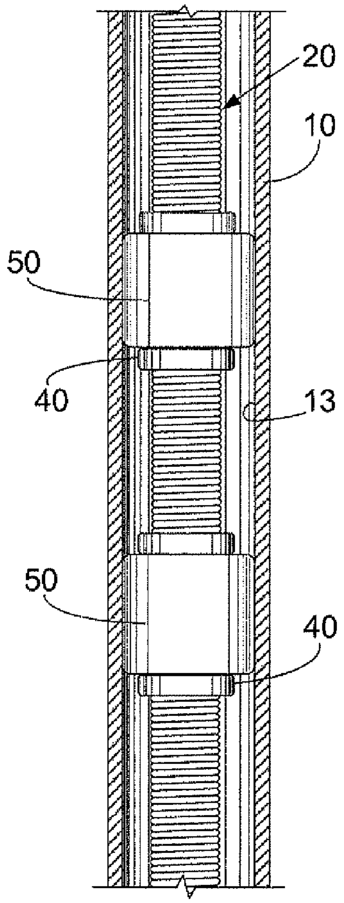
FIG. 2 is the same partial sectional view as FIG. 1 following a treatment method.

In FIG. 2, anchor assembly [50] has been released such that it is no longer in its compressed state. In one embodiment, anchor assembly [50] releases upon the application of heat to the coiled tubing. In other embodiments of the present invention, the release of anchor assembly [50] can be triggered by increased pressure, electrical charges, resonate frequency, or solvents. As shown in FIG. 2, anchor assembly [50] contacts inner wall [13] of coiled tubing [10], thereby transferring the weight of power cable [20] to coiled tubing [10].

Figure 4:
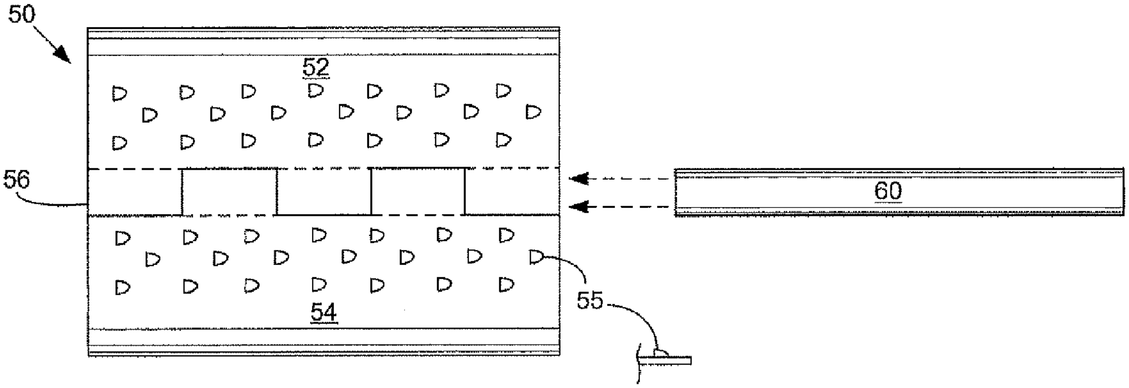
FIG. 4 is a side view of the anchor assembly and support pin in accordance with an embodiment of the present invention.
Figure 5:
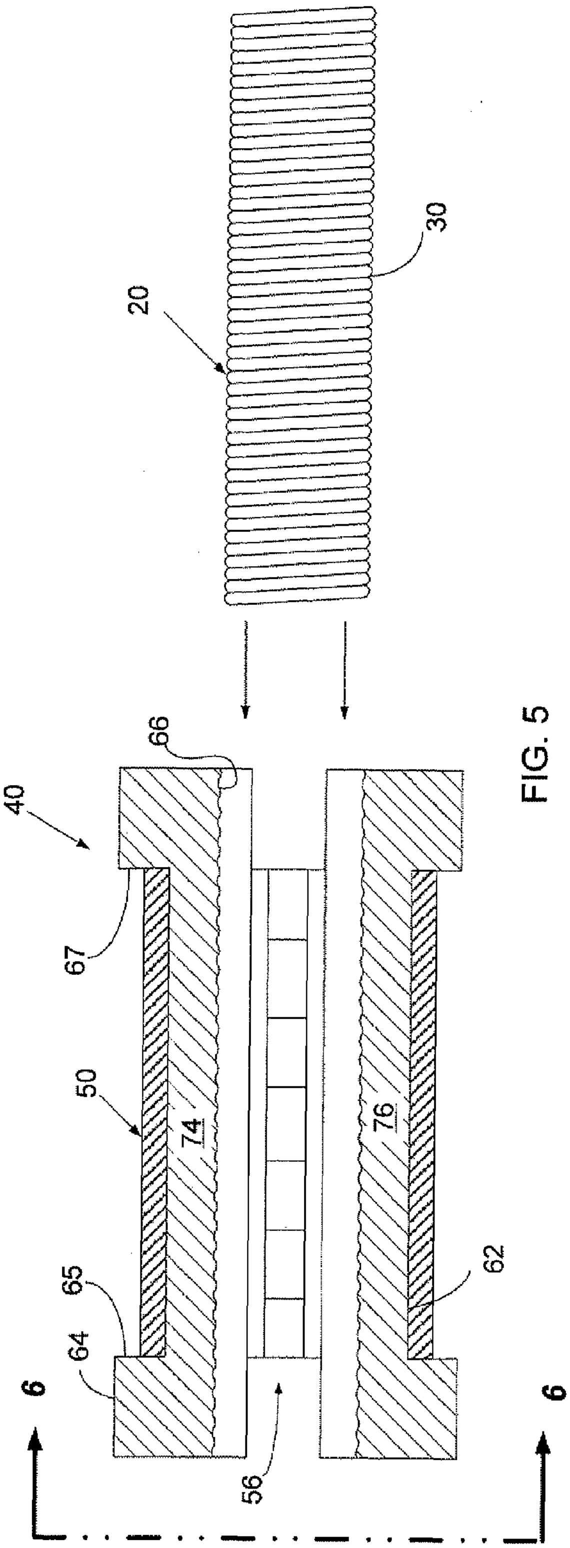
FIG. 5 is a cross sectional view of the body member and anchor assembly and a side view of the electrical cable in accordance with an embodiment of the present invention.

FIG. 3 represents a cross sectional view along line 3-3 of FIG. 1. In one embodiment, anchor assembly [50] is made up of a first engaging member [52] and a second engaging member [54]. In another embodiment, anchor assembly [50] can be made up of only one engaging member that wraps around the entire circumference of the body member [40], and therefore only uses one frangible support element [60]. In one embodiment, each engaging member [52, 54] can comprise a strip of resilient metal, such as steel. Each engaging member [52, 54] has a set of lips at the engaging member's [52, 54] edge, which form piano hinge [56] when interlocked together. In one embodiment, frangible support element [60] (FIG. 4) can be a support pin and can be inserted into piano hinge [56], and thereby lock first engaging member [52] and second engaging member [54] together in a compressed, substantially cylindrical form. The deflection of each engaging member [52, 54] from relatively flat to semi-cylindrical is below the yield point of the metal, such that engaging members [52, 54] are elastic. In this compressed form, anchor assembly [50] is coupled to the body member by contacting the outer periphery of the first outer diameter [62] of the body member. Referring to FIG. 5, second outer diameter [64] of the body member [40] has a diameter larger than that of first outer diameter [62] such that it forms a lower flange [65] and an upper flange [67]. Lower flange [65] keeps anchor assembly [50] from sliding downward when anchor assembly [50] is in a compressed state. Upper flange [67] supplies a downward force on anchor assembly [50], thereby preventing power cable [20] from slipping downward relative to anchor assembly [50] when anchor assembly [50] is in its decompressed state. Dashed lines [70, 72] in FIG. 3 represent first engaging member [52] and second engaging member [54], respectively, following shearing of frangible support element [60] (FIG. 4). As shown in FIG. 3, once anchor assembly [50] is no longer compressed, first and second engaging members [52, 54] spring out to contact the inner wall [13] of the coiled tubing [10], while also contacting first outer diameter [62] of body member [40].

FIG. 4 represents a side view of one embodiment of anchor assembly [50]. In the embodiment shown, anchor assembly [50] has first engaging member [52] and second engaging member [54]. When the two engaging members are compressed together, their respective lips interlock to form piano hinge [56]. Frangible support element [60] can then be inserted into piano hinge [56] in order to lock anchor assembly [50] into its compressed form. In one embodiment, each engaging member [52, 54] contains a plurality of outward-protruding tabs [55] formed by perforations. Tabs [55] are operable to contact inner wall [13] of coiled tubing [10] when anchor assembly [50] is in its decompressed position. In one embodiment of the present invention, outward-protruding tabs [55] are shaped like the gratings of a cheese grater.

FIG. 5 represents a cross-sectional view of one embodiment of the present invention in which anchor assembly [50] is coupled to the outer periphery of body member [40]. In one embodiment, body member [40] has two symmetrical, semi-cylindrical body halves [74, 76]. Each body half has a first outer diameter [62], lower flange [65], upper flange [67] (collectively "flanges"), and an inner diameter [66]. In an embodiment, flanges [65, 67] are larger in diameter than first outer diameter [62]. Furthermore, in an embodiment of the present invention, flanges [65, 67] are larger in diameter than the diameter of the sprung anchor assembly's load shoulder. The load shoulder is the upper edge portion of engaging members [52, 54] which abut upper flange [67]. This allows anchor assembly [50] to provide an upward force to the upper flange [67], which in turn allows for transference of power cable's [20] weight to coiled tubing [10]. Additionally, FIG. 5 demonstrates how the pitch of inner diameter [66] matches helically spaced grooves [30] of power cable [20]. This matching of the pitch forms a threaded connection, which prevents power cable [20] from sliding down body member [40] when placed within the wellbore. FIG. 5 also demonstrates one embodiment in which body halves [74, 76] do not meet, and thus only partially surround power cable [20]. This allows frangible support element [60] to be more easily inserted into piano hinge [56].

Figure 6:
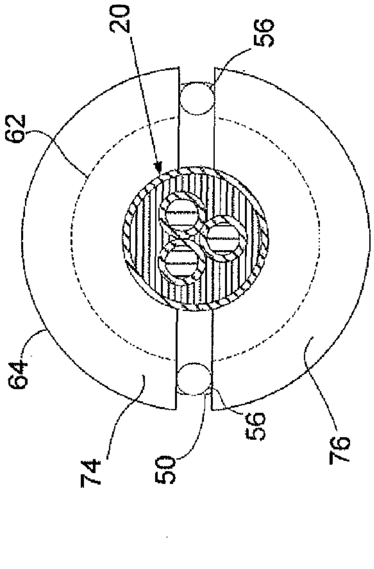
FIG. 6 is a side view along line 6-6 of FIG. 5.

FIG. 6 represents a side view along line 6-6 of FIG. 5. As shown, each body half [74, 76] partially surrounds the outer periphery of the power cable [20], and each body half [74, 76] also has a second outer diameter [64] that is larger than the first outer diameter [62] thereby forming lower flange [65] and upper flange [67].

Figure 7:
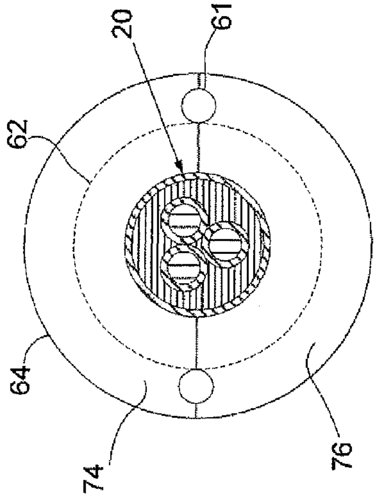
FIG. 7 is an alternate embodiment of the apparatus shown in FIG. 6.

FIG. 7 represents an optional embodiment in which combined body halves [74, 76] completely surround power cable [20]. In this embodiment, each body half [74, 76] can have a semi-circular aperture that form receiving aperture [61] when the body halves [74, 76] are mated. Receiving aperture [61] is preferably sized to accommodate frangible support element [60].

In order to install the power cable [20] within the coiled tubing [10], the user pulls the power cable [20] through the coiled tubing [10] while anchor assembly [50] is secured in its compressed state. In one embodiment, once the power cable [20] is in place, the user can then apply heat to coiled tubing [10], preferably localized heat located near each anchor assembly [50], for example with a controlled induction heater, such that frangible support elements [60] melt, allowing engagement members [52, 54] to spring open, thereby engaging inner wall [13] of coiled tubing [10]. In other embodiments of the present invention, a solvent can be pumped through the coiled tubing [10] and contact frangible support elements [60], causing frangible support elements [60] to dissolve or weaken to the point frangible support elements [60] shear and release engaging members [52, 54]

from their compressed state. In embodiments using heat to shear frangible support element [60], a solder having a liquidous temperature below the temperature that can harm the power cable can be used, and preferably a eutectic solder can be used. In one embodiment, frangible support element [60] has a fail temperature around 300° F. In embodiments wherein frangible support element [60] can be dissolved, a number of plastics are acceptable, for example, polypropylene or nylon.

The invention has significant advantages as embodiments of the present invention do not require the user to make indentions along the length of the coiled tubing, which can be time consuming, imprecise, and damaging to the power cable.

While the invention has been shown or described in only some of its forms, it should be apparent to those skilled in the art that it is not so limited, but is susceptible to various changes without departing from the scope of the invention.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims. For example, screws can be added in various places to add additional stability. For instance, screws can be added on the flanges to ensure tight contact with the power cable. Additionally, the anchor assembly could be screwed into the body member. While the invention has been shown in only one of its forms, it should be apparent to those skilled in the art that it is not so limited but is susceptible to various changes without departing from the scope of the invention. Additionally, the present invention may suitably comprise, consist or consist essentially of the elements disclosed and can be practiced in the absence of an element not disclosed. It is intended that all such variations within the scope and spirit of the invention be included within the scope of the appended claims.

What is claimed is:

1. An apparatus for supporting the weight of a cable within tubing in a well, the apparatus comprising:
- a body member adapted to be coupled around a cable and inserted in tubing;
- a radially extending external flange connected to the body member;
- an anchor assembly mounted to the body member and movable between a contracted position and an expanded position, the anchor assembly having a plurality of engagement members, the engagement members being compressed and biased toward the expanded position, thereby allowing the anchor assembly to spring into engagement with the tubing when uncompressed, the anchor assembly being in engagement with the flange in both the contracted and expanded position; and
- a frangible support element that releasably retains the anchor assembly in the contracted position and is operable to fail at a predetermined condition causing the anchor assembly to engage an inner wall of the tubing upon failure of the frangible support element, thereby transferring the weight of the cable to the tubing.

2. The apparatus of claim 1, wherein the predetermined condition comprises an elevated temperature.

3. The apparatus of claim 1, wherein the predetermined condition comprises the application of a solvent that is operable to dissolve the frangible support element.

4. The apparatus of claim 1, wherein the predetermined condition is selected from the group consisting of a pressure increase, electrical charges, resonate frequency, and combinations thereof.

5. The apparatus of claim 1, wherein anchor assembly comprises two lips that intermesh to form a hinge while in the contracted condition, and the frangible support element comprises a pin that inserts into the hinge.

6. The apparatus of claim 1, wherein the body member comprises an inner diameter having a helical pitch to match a pitch of the cable, such that the body member and the cable form a threaded connection.

7. The apparatus of claim 1, wherein the body member comprises two body halves that are adapted to clamp around the cable.

8. The apparatus of claim 1, wherein each the body member comprises a receiving aperture that is operable to accommodate the frangible support element.

9. The apparatus of claim 1, wherein the anchor assembly comprises two leaf springs, each leaf spring having sets of lips at opposite edges, the sets of lips of one leaf spring with the sets of lips of the other leaf spring operable to form a piano hinge when the leaf springs are compressed.

10. The apparatus of claim 1, wherein the frangible support element is a solder having a liquidous temperature below the temperature that can harm a power cable.

11. The apparatus of claim 1, wherein the frangible support element comprises a plastic material.

12. The apparatus of claim 1, wherein the plurality of engagement members of the anchor assembly extend substantially between a lower and upper end portion of the flange.

13. An apparatus for powering a submersible pump, the apparatus comprising:
- a length of coiled tubing;
- a power cable;
- a body member clamped around the power cable;
- a resilient anchor assembly extending around the body member, the anchor member being biased from a contracted position radially outward relative to an axis of the body member toward an expanded position, the anchor assembly having at least two edges that intermesh to form a hinge while in the contracted position; and
- a frangible pin that inserts into the hinge to retain the anchor assembly in the contracted position, allowing insertion of the body member and anchor assembly into the coiled tubing, the frangible pin being shearable upon the occurrence of a predetermined condition to allow the anchor assembly to move to the expanded position, gripping an inner wall of the tubing.

14. The apparatus of claim 13, wherein the predetermined condition comprises an elevated temperature.

15. The apparatus of claim 13, further comprising a radially extending external flange on the body member, the anchor assembly being in engagement with the flange in both the contracted and expanded position.

16. The apparatus of claim 13, wherein the predetermined condition comprises the application of a solvent that is operable to dissolve the frangible support element.

17. The apparatus of claim 13, wherein the predetermined condition is selected from the group consisting of a pressure increase, electrical charges, resonate frequency, and combinations thereof.

18. The apparatus of claim 13, wherein the anchor assembly comprises two leaf springs, each leaf spring having sets of lips at opposite edges, the sets of lips of one leaf spring with the sets of lips of the other leaf spring operable to form a piano hinge when the leaf springs are compressed.

19. A method for transferring the weight of a power cable to coiled tubing, the method comprising:

(a) coupling a body member to an outer periphery of a power cable;

(b) mounting an anchor assembly to the body member, the anchor member being biased from a contracted position radially outward relative to an axis of the body member toward an expanded position, the anchor assembly having at least two edges that intermesh to form a hinge while in the contracted position;

(c) locking the anchor assembly in a compressed state using a frangible pin that inserts into the hinge to retain the anchor assembly in the contracted position, allowing insertion of the body member and anchor assembly into the coiled tubing; then (d) introducing the power cable and the body member through an inner portion of a length of the coiled tubing; and (e) shearing the frangible pin upon the occurrence of a predetermined condition to allow the anchor assembly to move to the expanded position, thereby gripping an inner wall of the tubing and allowing the anchor assembly to spring into engagement with the coiled tubing.

20. The method of claim 19, wherein step (e) comprises applying localized heat to the coiled tubing adjacent the body member.

21. The method of claim 19, wherein step (e) comprises introducing a solvent through the coiled tubing and contacting frangible support element with the solvent.

* * * * *